(12) United States Patent
Mason

(10) Patent No.: US 12,281,803 B2
(45) Date of Patent: Apr. 22, 2025

(54) BOILER PRESSURE RELIEF VALVE AND AUTOMATIC AIR VENT ISOLATION ASSEMBLY

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 742 days.

(21) Appl. No.: 17/524,010

(22) Filed: Nov. 11, 2021

(65) Prior Publication Data

US 2023/0141143 A1   May 11, 2023

(51) Int. Cl.
| | |
|---|---|
| F24D 19/08 | (2006.01) |
| F16K 11/22 | (2006.01) |
| G01L 19/14 | (2006.01) |

(52) U.S. Cl.
CPC ............ *F24D 19/083* (2013.01); *F16K 11/22* (2013.01); *G01L 19/14* (2013.01)

(58) Field of Classification Search
CPC ...... F16K 11/207; F16K 11/22; F16K 27/067; G01L 19/007; G01L 19/14; G16K 17/02
See application file for complete search history.

(56) References Cited

U.S. PATENT DOCUMENTS

| | | | |
|---|---|---|---|
| 7,631,662 B2 | 12/2009 | Reck | |
| 10,458,662 B2 | 10/2019 | Olsen et al. | |
| 2004/0124386 A1 | 4/2004 | Carey | |
| 2010/0018911 A1* | 1/2010 | VanZeeland | E03B 1/04 210/417 |
| 2011/0073201 A1 | 3/2011 | Matsui et al. | |
| 2012/0193043 A1* | 8/2012 | Bishop | E06B 9/262 160/370 |
| 2016/0097550 A1 | 4/2016 | Karamanos | |

FOREIGN PATENT DOCUMENTS

| | | |
|---|---|---|
| CN | 205781020 | 12/2016 |
| CN | 207195715 | 4/2018 |
| JP | H07301351 | 11/1995 |

OTHER PUBLICATIONS

Webstone, Pro-Pal Series Union Ball Drain, www.webstonevalves.com/default.aspx?page=customer&file=customer/wecoin/customerpages/unionballdrain.htm (2020).

* cited by examiner

*Primary Examiner* — Daphne M Barry
(74) *Attorney, Agent, or Firm* — PRICE HENEVELD LLP

(57) ABSTRACT

An isolation assembly for a boiler unit that incorporates a pressure relief valve and an automatic air vent to a valve body that includes a valve positioned adjacent to the automatic air vent. The unitary valve body reduces the number of components and leak paths and incorporates a ball valve to permit removing and/or securing the automatic air vent without having to purge the adjacent plumbing system.

20 Claims, 7 Drawing Sheets

BOILER PRESSURE RELIEF VALVE AND AUTOMATIC AIR VENT ISOLATION ASSEMBLY

BACKGROUND OF THE INVENTION

The present invention relates to an isolation assembly for a boiler. Boilers can be used in building heating applications. Boilers can be mounted on the floor and/or walls of a building. Pressure can build up in the plumbing components adjacent to a boiler. A number of components are typically necessary to couple an isolation valve, a pressure relief valve, and an automatic air vent in the plumbing systems adjacent to a boiler. This typically includes multiple segments of piping in between such components. This creates additional leak paths, takes additional time to assembly, and takes space given the number of components.

An improved assembly that eliminates a number of components and potential leak paths, while saving assembly time, labor, and space, is described herein.

SUMMARY OF THE INVENTION

One aspect of the present invention is a valve assembly. The valve assembly includes a unitary valve body having a first end section, a second end section, and a medial section located between the first end section and second end section. The unitary valve body includes first and second opposed ports at the first end section and a generally perpendicular section that transitions from the first end section to the medial section. The unitary valve body also has a second end section that includes a third port that is positioned generally perpendicular to the medial section after an elbow in the fluid passageway. The valve assembly includes a union member that is coupled to the second port. A valve member is located on the unitary body in between the elbow and the third port in the second end section of the valve body. The valve member opens and closes the fluid passageway between the elbow and the third port. A pressure relief valve is coupled to the first port with an automatic air vent coupled to the third port. A fourth port is located in the medial section of the unitary valve body. A gauge is coupled to the fourth port.

Another aspect of the present invention is a valve assembly for a boiler. The valve assembly includes a unitary valve body that has a first end section, a second end section, and a medial section located between the first end section and the second end section. The first end section has opposed first and second ports with a generally perpendicular section that transitions into the medial section of the unitary valve body. The second end section includes a third port that is positioned generally perpendicular to the medial section after an elbow in the fluid passageway of the unitary valve body. A pressure relief valve is coupled to the first port and an automatic air vent is coupled to the third port. The second port of the unitary valve body is coupled to a boiler vent outlet. The valve assembly includes a valve member located on the unitary valve body in between the elbow and third port and the second end section of the valve body. The valve member opens and closes the fluid passageway between the elbow and the third port. A fourth port is located in the medial section of the unitary valve body with a gauge coupled to the fourth port.

Yet another aspect of the present invention is a boiler assembly. The boiler assembly includes a boiler unit with a vent outlet. The boiler assembly includes a unitary valve body having a first end section, a second end section, and a medial section located in between the first end section and second end section. The first end section has opposed first and second ports with a generally perpendicular section that transitions into the medial section of the unitary valve body. The second end section includes a third port that is positioned generally perpendicular to the medial section after an elbow in the fluid passageway of the unitary valve body. A pressure relief valve is coupled to the first port while the second port is coupled to the vent outlet of the boiler unit. A valve member is located on the unitary body in between the elbow in the third port and the second end section. The valve member opens and closes the fluid passageway between the elbow and the third port. An automatic air vent is coupled to the third port. A gauge is coupled to a fourth port that is located in the medial section of the unitary valve body.

These and other features, advantages, and objects of the present invention will be further understood and appreciated by those skilled in the art by reference to the following specification, claims, and appended drawings.

DETAILED DESCRIPTION

Figure 1:
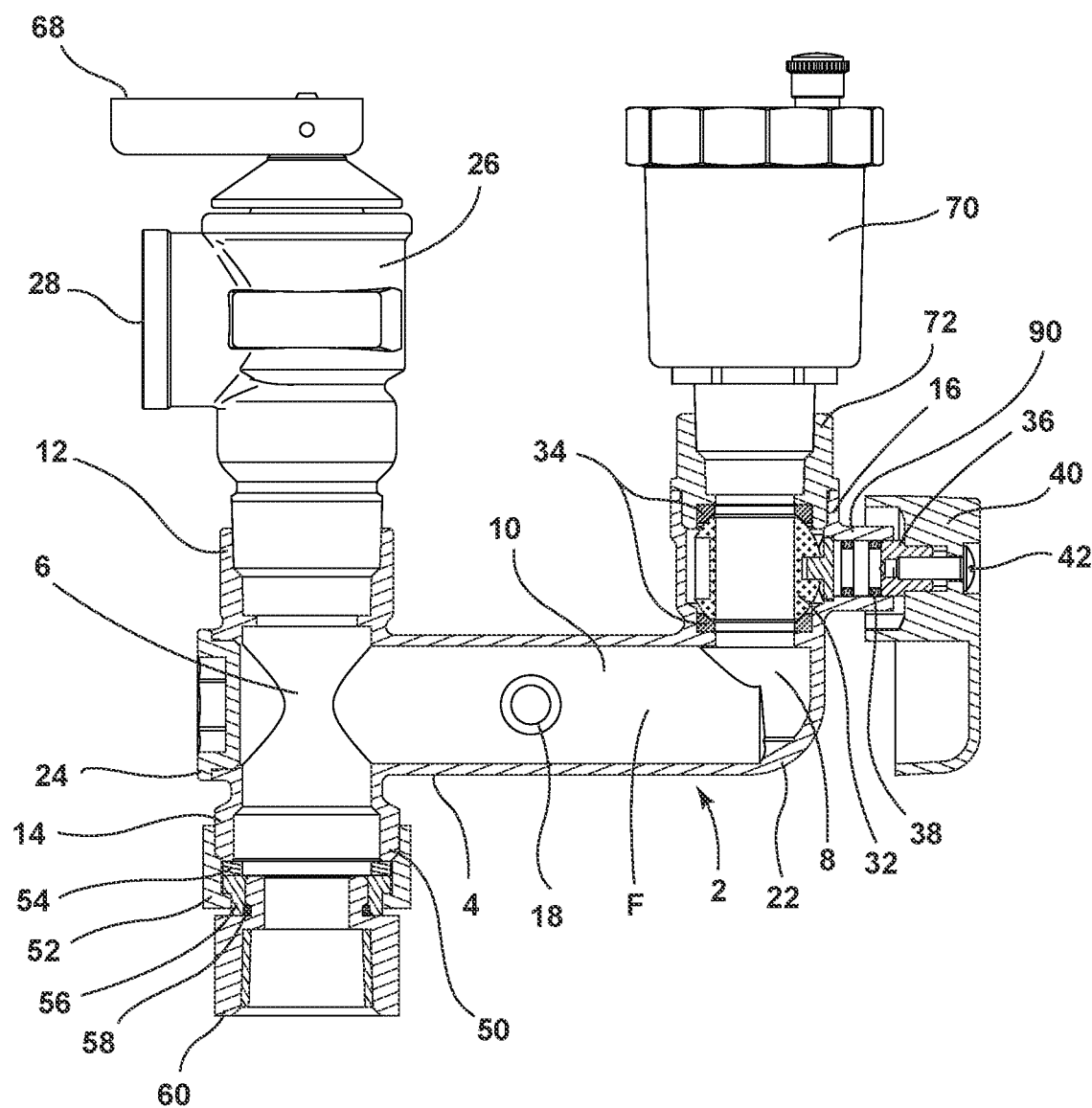
FIG. 1 is a partial front cross-sectional view of a boiler pressure relief valve and automatic air vent isolation assembly according to one aspect of the present invention.
Figure 2:
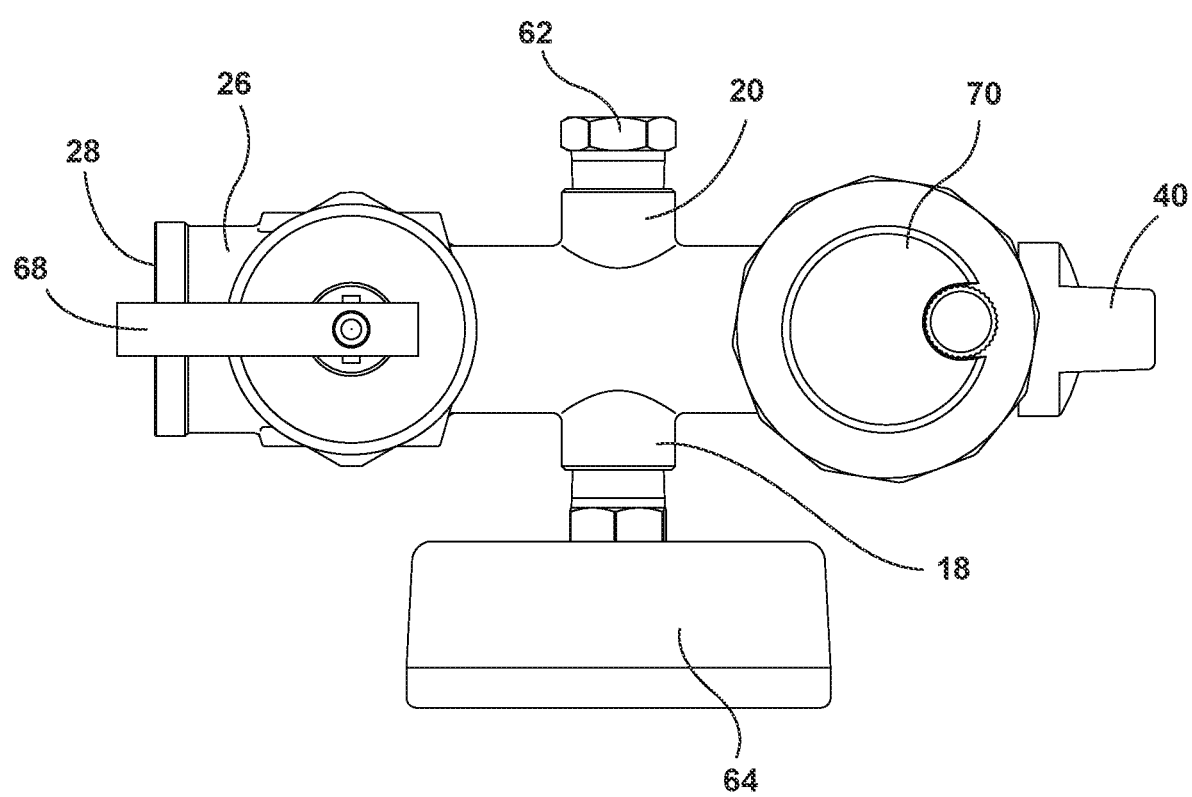
FIG. 2 is a top elevational view of the isolation assembly shown in FIG. 1.
Figure 3:
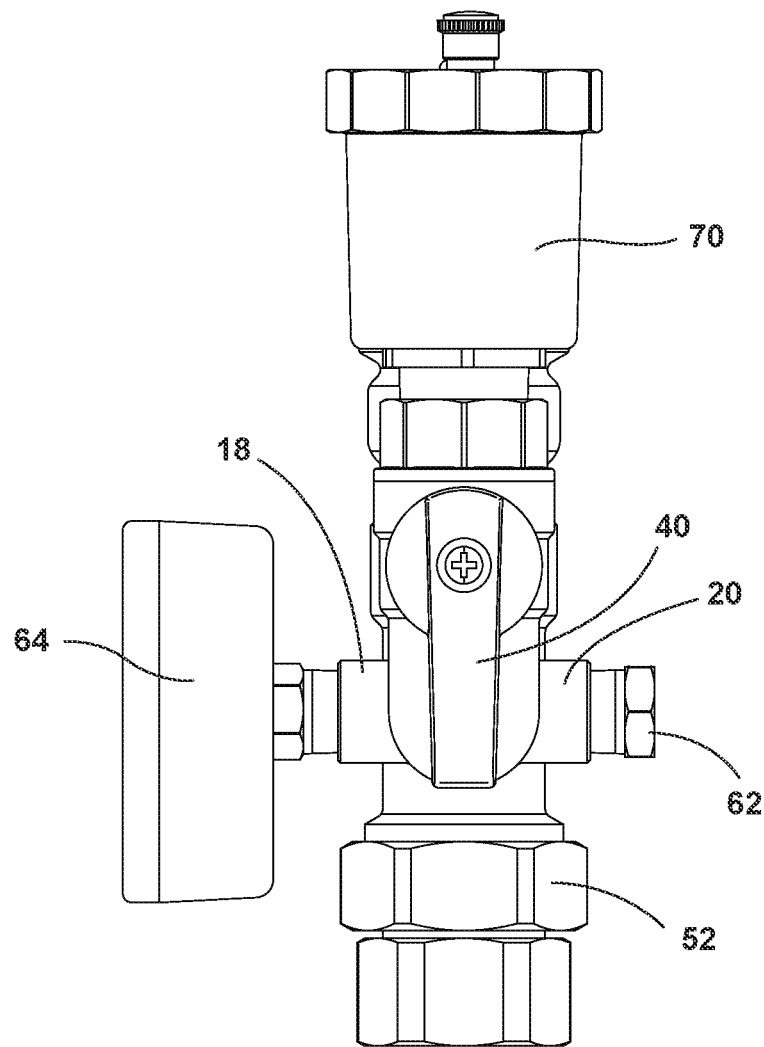
FIG. 3 is a side elevational view of the isolation assembly shown in FIG. 1.
Figure 4:
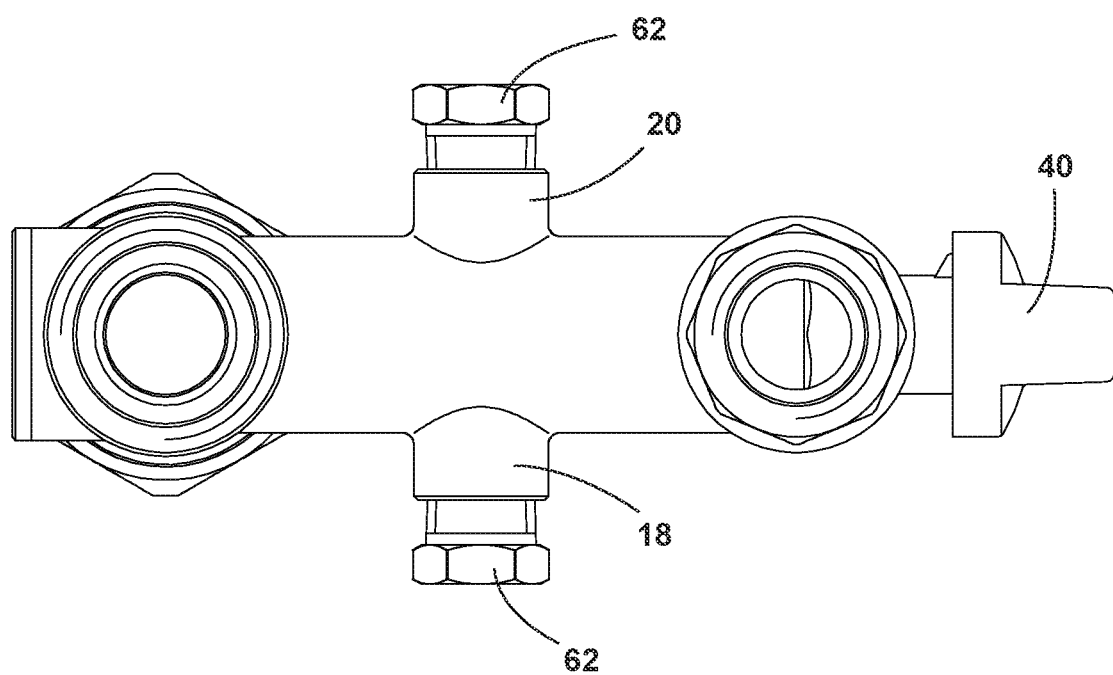
FIG. 4 is a top elevational view of the isolation assembly shown in FIG. 1 with the automatic air vent pressure relief valve and gauge removed.
Figure 5:
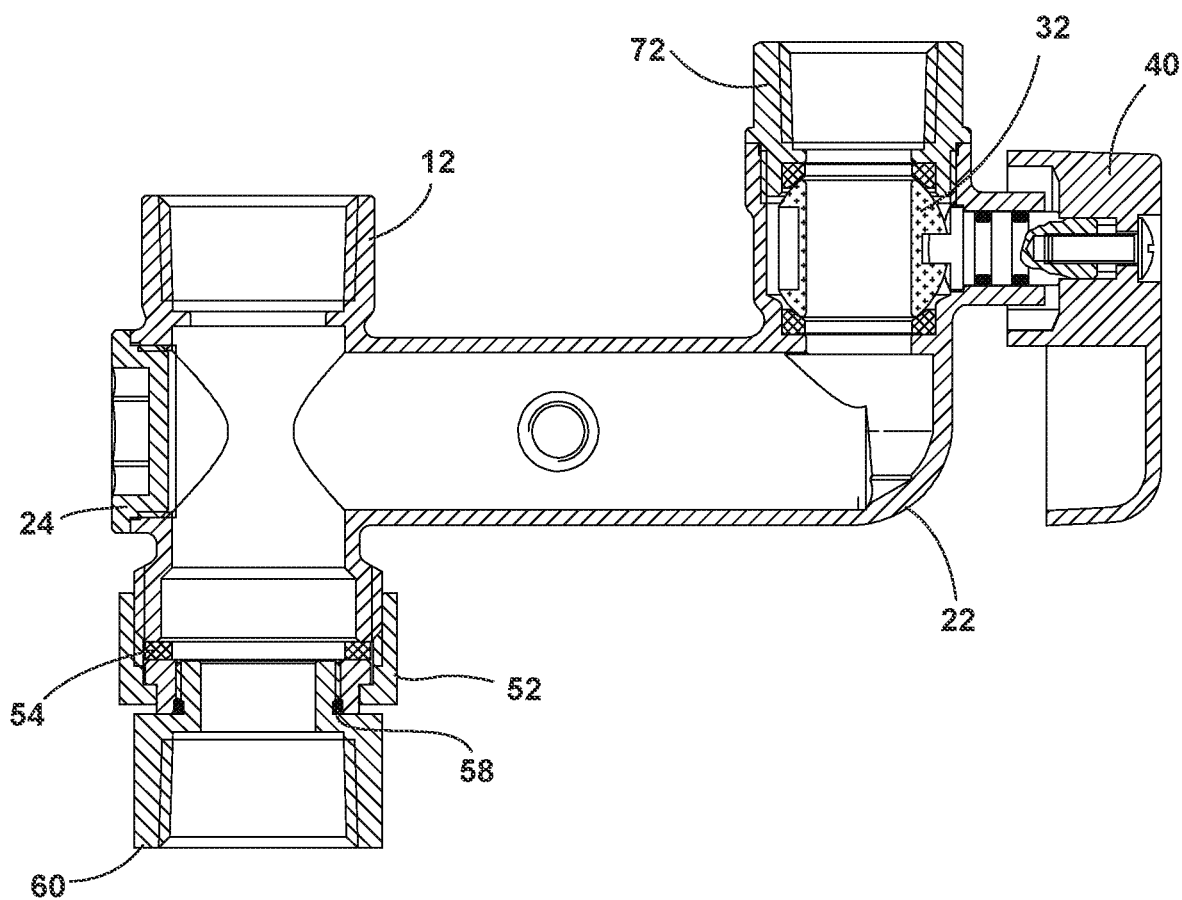
FIG. 5 is a front cross-sectional view of the isolation assembly shown in FIG. 4.
Figure 6:
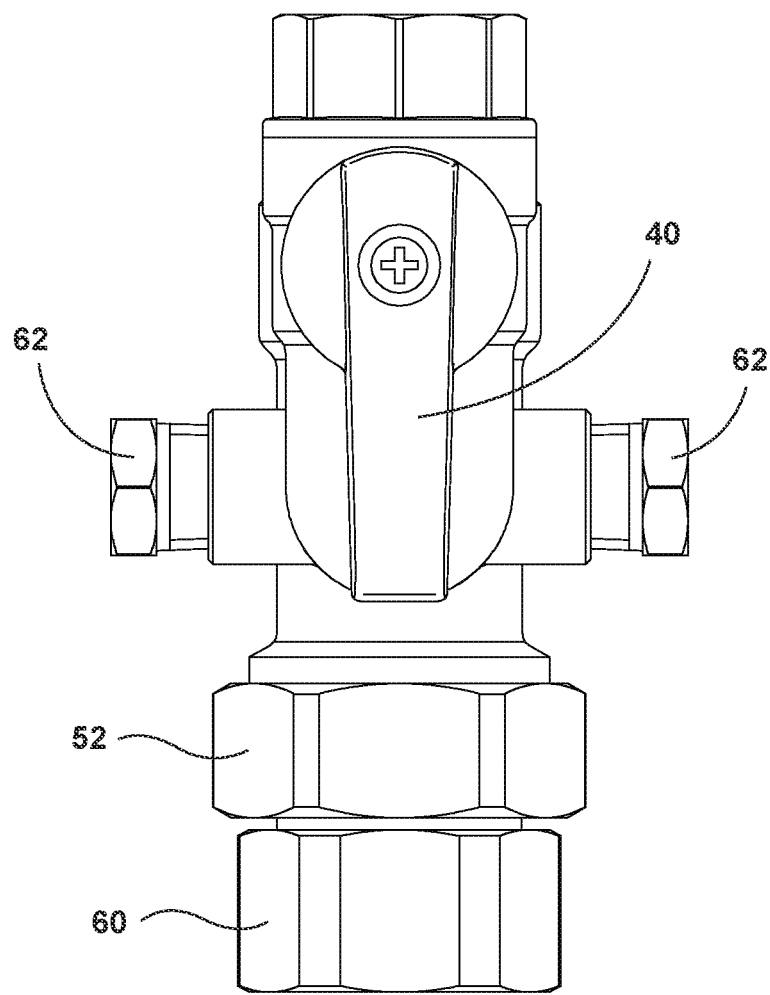
FIG. 6 is a side elevational view of the isolation assembly sown in FIG. 4.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. Indeed, other exemplary orientations are shown in the Figures. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

By way of overview, the present invention is generally directed to an isolation valve assembly 2 that can be used in connection with a boiler unit. The isolation valve assembly 2 includes a valve body 4. The valve body 4 has a first end section 6, a second end section 8, and a medial section 10 located between the first end section 6 and the second end section 8. The first end section 6 includes a first port 12 and an oppositely disposed second port 14. A third port 16 is located on the second end section 8 after elbow 22 in fluid passageway F. In the illustrated embodiment, the medial section 10 of the valve body 4 includes a fourth port 18 with an oppositely disposed fifth port 20. When the first port 12, second port 14, and third port 16 are oriented in a generally vertical manner, the fourth port 18 and fifth port 20 will be oriented in a generally horizontal manner, as illustrated in FIGS. 2-4 and 6. The valve body 4 can include an integrally formed first end section 6 or, alternatively, as shown in the illustrated embodiments, a plug 24 in the first end section 6.

A pressure relief valve 26, having a discharge port 28 that can be actuated by handle 68, is illustrated as being coupled to first port 12. The second port 14 is coupled to the vent port of a boiler unit. The second port 14 can include a union member 50 that will permit the rotation of the valve body 4 with respect to the boiler unit. This will permit the discharge port 28 of the pressure relief valve 26 to be oriented away from the boiler and/or other plumbing components. The union member 50 includes a locking nut 52, sealing joint 54, clamp ring 56, and adaptor 60, as illustrated in FIG. 1, for coupling the second port 14 to the vent port of a boiler unit. The use of the union member 50 permits the adaptor 60 to be sealed with respect to the second port 14 by compression of the sealing joint 54 and O-ring 58 by the engagement of the locking nut 52 onto the second port 14 and/or adaptor 60. Threaded surfaces can be used for such engagement and can be located on the locking nut 52 with corresponding threaded surfaces on the second port 14 and/or the adaptor 60 to engage and seal the union member 50 that couples the second port 14 to the vent port of a boiler unit.

A valve member 30 is located on the second end section 8 of the valve body 4, as illustrated in FIG. 1. The valve member 30 includes a ball 32 that is positioned in the fluid passageway. Sealing ring 34 is positioned around the ball 32 within the fluid passageway. The ball 32 is actuated by a stem 36 that is coupled to handle 40 by screw 42. The stem O-rings 38 help seal the stem 36 within the stem opening 90 on the valve body 4. The handle 40 can be used to open or close the fluid passageway F between the elbow 22 and the third port 16.

An automatic air vent 70 is coupled to the third port 16. The valve member 30 positively closes the fluid passageway F to permit the replacement or service of the automatic air vent 70 without having to remove the valve body 4 from the boiler unit or to purge the surrounding boiler and plumbing system.

A gauge 64 is coupled to either the fourth port 18 or fifth port 20 in the medial section 10 of valve body 4. In the illustrated embodiment, the gauge 64 is a pressure gauge. The opposite port is plugged with plug 62. The oppositely disposed fourth and fifth ports 18, 20 permit the installation of the gauge 64 in alternative arrangements giving space or other restrictions with respect to the boiler unit. When a gauge 64 is not installed, both the fourth port 18 and fifth port 20 are closed with plugs 62.

Figure 7:
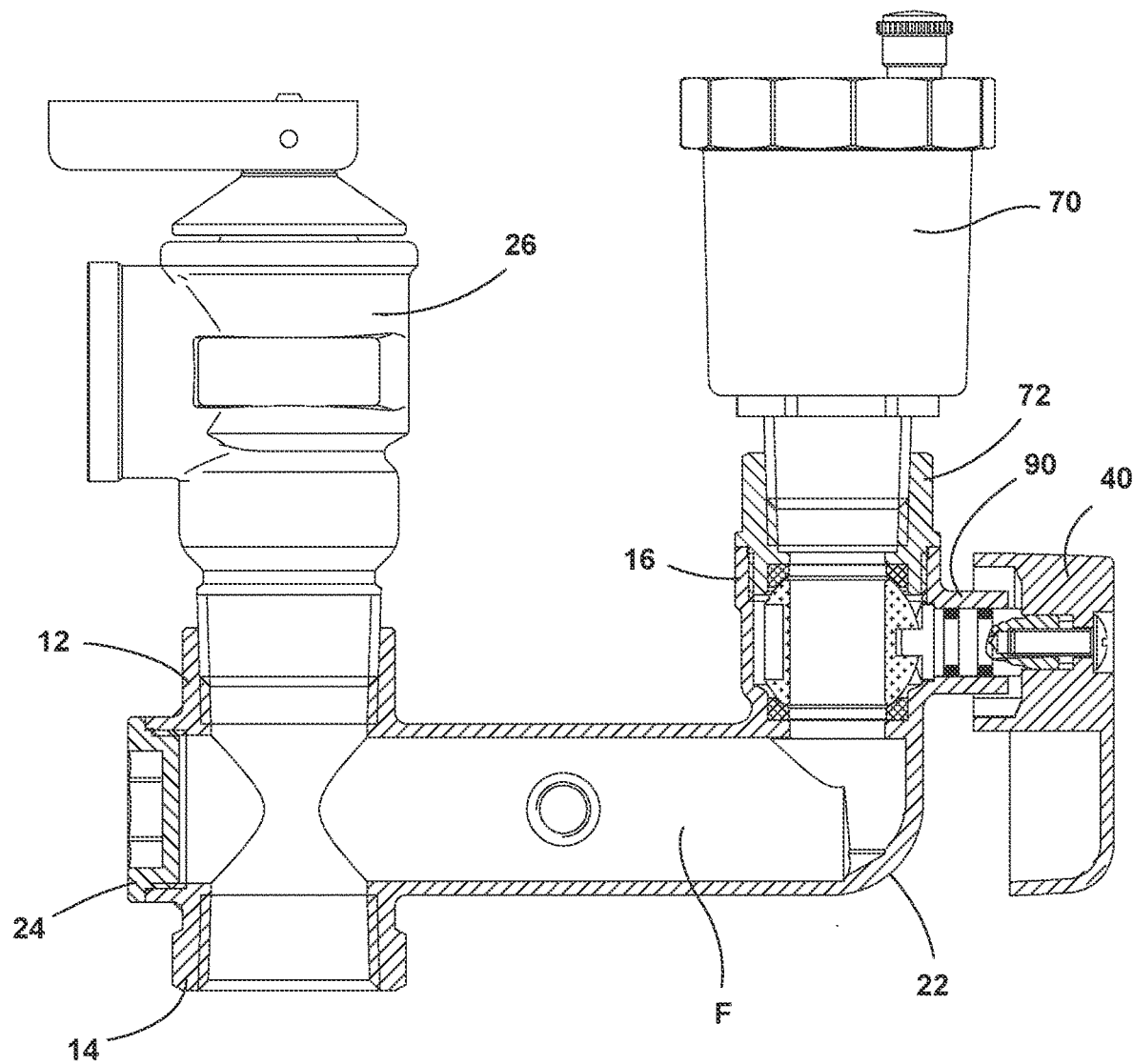
FIG. 7 is a partial front cross-sectional view of another embodiment of a boiler pressure relief valve and automatic air vent isolation assembly.

While the embodiment illustrated in FIGS. 1-6 utilizes a union member 50 to couple the second port 14 to a vent port of a boiler unit, FIG. 7 illustrates and alternative embodiment where the second port 14 can be coupled to the vent port of a boiler unit without utilizing a union member 50. For example, the second port 14 can include female pipe thread or other type of connection to couple to the vent port of the boiler unit. Other connections can include push-to-connect, press fit, male pipe thread, sweat, and other common connections.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the afore-mentioned structures and methods without departing from the concepts of the present invention, and further it is to be understood that such concepts are intended to be covered by the following claims unless these claims by their language expressly state otherwise.

The invention claimed is:

1. A valve assembly, comprising:
a unitary valve body having a first end section, a second end section, and a medial section located in between said first end section and said second end section, wherein said first end section has opposed first and second ports with a generally perpendicular section that transitions into said medial section; and
said second end section includes a third port that is positioned generally perpendicular to said medial section after an elbow in the fluid passageway of said unitary valve body;
a union member, coupled to said second port;
a valve member located on said unitary valve body in between said elbow and said third port in said second end section, wherein said valve member opens and closes said fluid passageway between said elbow and said third port;
a pressure relief valve having a handle and a discharge port coupled to said first port;
an automatic air vent with a vent cap that automatically releases trapped air, coupled to said third port;
a fourth port located in said medial section; and
a gauge coupled to said fourth port.

2. The valve assembly of claim 1, wherein said first end portion includes an additional port perpendicular to said first and second ports with a removable plug.

3. The valve assembly of claim 1, wherein said gauge is a pressure gauge.

4. The valve assembly of claim 1, wherein said union member is coupled to a boiler vent outlet.

5. The valve assembly of claim 1, wherein said medial section includes a fifth port that is positioned opposite said fourth port.

6. The valve assembly of claim 5, wherein said fourth and fifth ports will be positioned generally horizontally on said valve body when said first, second, and third ports are positioned generally vertically.

7. The valve assembly of claim 1, including a bonnet coupled to said third port.

8. A valve assembly for a boiler, comprising:
a unitary valve body having a first end section, a second end section, and a medial section located in between said first end section and said second end section, wherein said first end section has opposed first and second ports with a generally perpendicular section that transitions into said medial section; and
said second end section includes a third port that is positioned generally perpendicular to said medial section after an elbow in the fluid passageway of said unitary valve body;
a pressure relief valve having a handle and a discharge port coupled to said first port;
said second port coupled to a boiler vent outlet;
a valve member located on said unitary valve body in between said elbow and said third port in said second end section, wherein said valve member opens and closes said fluid passageway between said elbow and said third port;
an automatic air vent with a vent cap that automatically releases air, coupled to said third port;
a fourth port located in said medial section; and
a gauge coupled to said fourth port.

9. The valve assembly of claim 8, wherein said first end portion includes an additional port positioned between said first and second ports.

10. The valve assembly of claim 8, wherein said gauge is a pressure gauge.

11. The valve assembly of claim 8, wherein said second port includes a union member with a locking nut.

12. The valve assembly of claim 8, wherein said medial section includes a fifth port that is positioned opposite said fourth port.

13. The valve assembly of claim 12, wherein said fourth and fifth ports will be positioned generally horizontally on said valve body when said first, second, and third ports are positioned generally vertically.

14. The valve assembly of claim 8, including a bonnet coupled to said third port.

15. A boiler assembly, comprising:
a boiler unit with a vent outlet;
a unitary valve body having a first end section, a second end section, and a medial section located in between said first end section and said second end section, wherein said first end section has opposed first and second ports with a generally perpendicular section that transitions into said medial section; and
said second end section includes a third port that is positioned generally perpendicular to said medial section after an elbow in the fluid passageway of said unitary valve body;
a pressure relief valve having a handle and a discharge port coupled to said first port, said second port coupled to said vent outlet;
a valve member located on said unitary valve body in between said elbow and said third port in said second end section, wherein said valve member opens and closes said fluid passageway between said elbow and said third port;
an automatic air vent with a vent cap to release air, coupled to said third port;
a fourth port located in said medial section; and
a gauge coupled to said fourth port.

16. The boiler assembly of claim 15, wherein said first end portion includes an additional port positioned between said first and second ports with a removable plug.

17. The boiler assembly of claim 15, wherein said gauge is a pressure gauge.

18. The boiler assembly of claim 15, including a union member with a locking nut that couples said boiler vent to said second port.

19. The boiler assembly of claim 15, wherein said medial section includes a fifth port that is positioned opposite said fourth port.

20. The boiler assembly of claim 19, wherein said fourth and fifth ports will be positioned generally horizontally on said valve body when said first, second, and third ports are positioned generally vertically.

\* \* \* \* \*